Patented Jan. 30, 1951

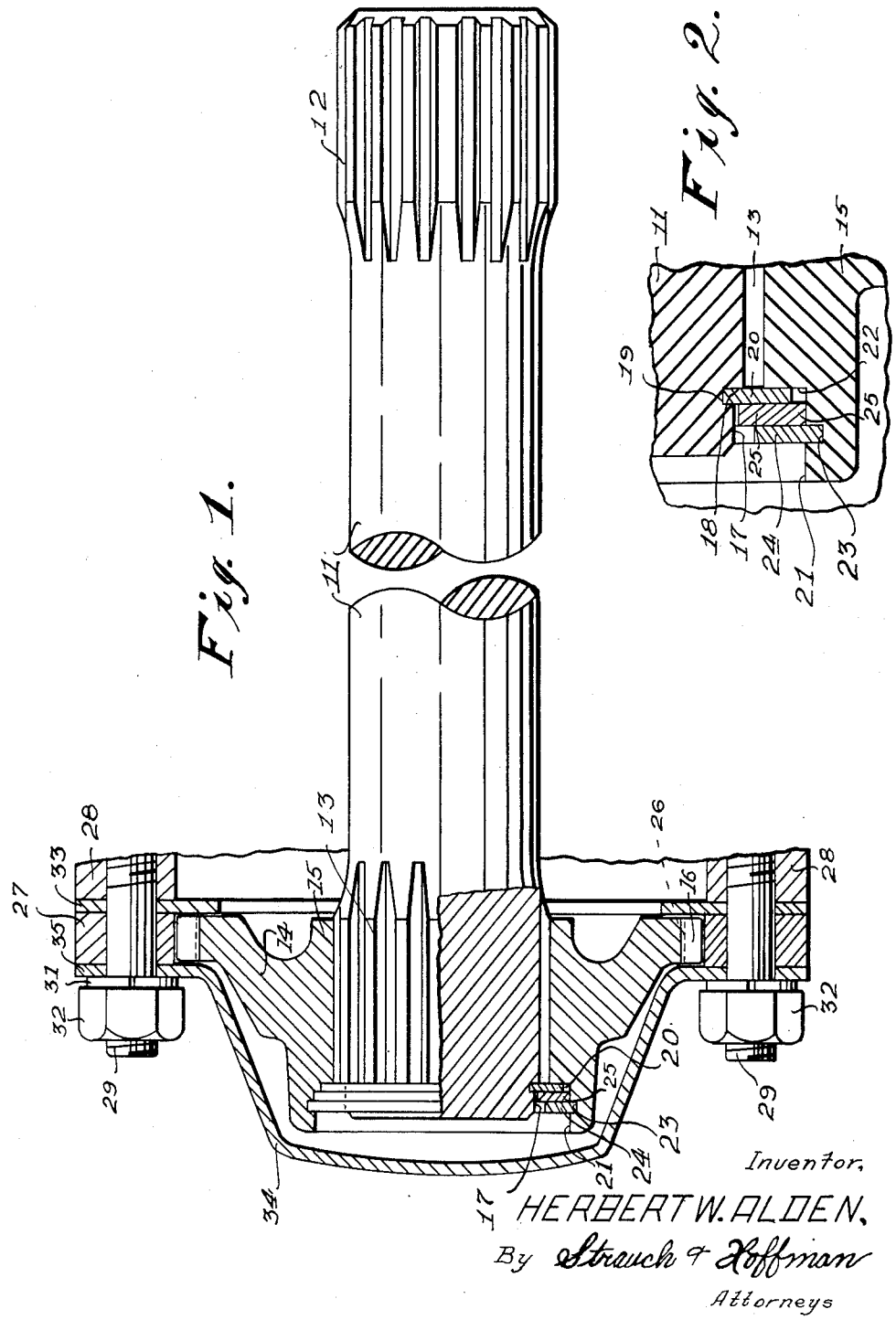

2,539,387

UNITED STATES PATENT OFFICE 2,539,387

VEHICLE WHEEL DRIVE

Herbert W. Alden, Detroit, Mich., assignor to The Timken-Detroit Axle Company, Detroit, Mich., a corporation of Ohio Application August 17, 1945, Serial No. 610,940

10 Claims. (Cl. 301—112)

This invention relates to vehicle wheel drive assemblies and is more particularly concerned with improved vehicle wheel drive arrangements wherein an axle shaft is connected to a wheel hub through an intermediate drive sufficiently flexible to compensate for misalignment, tolerances and slight inaccuracies in machining, or to load deflection in operation.

The preferred embodiment of the invention relates to vehicle drive axle construction wherein a driven axle shaft drives a gear non-rotatable therewith, and the gear is meshed with an internal gear on a wheel hub to be driven thereby.

It has heretofore been proposed to provide a gear integrally with the outer ends of axle shafts and mesh the gear directly with an internal or external gear on the wheel hub. This arrangement was not sufficiently flexible to compensate for manufacturing tolerances or bending of the axle shaft due to load deflection, which tend to misalign the hub and the axle shaft, and has been unsatisfactory.

It is proposed according to the present invention to make the axle shaft gear separate from the axle and secure it non-rotatably but removably to the axle shaft in a special manner which is structurally simple, prevents relative axial movement therebetween and does not weaken the shaft. An especially important phase of the present invention is my novel structure for securing the gear non-rotatably with the axle shaft and in such a manner that axial movement between the gear and shaft is prevented in both directions.

It is therefore a major object of the invention to provide an improved flexible axle to hub connection in a vehicle wheel drive wherein the axle and hub are interconnected by an intermediate gear so as to compensate for misalignment due to manufacturing tolerances and inaccuracies or to load deflection.

A further object of the invention is to provide a novel connection between a drive shaft and a motion transmitting member wherein the member is non-rotatably secured to the shaft and prevented from axial movement relative thereto.

A further object of the invention is to provide a novel relative axial movement eliminating connection between a shaft and a drive member splined thereto wherein an overlapped snap ring and washer assembly is provided between coextensive end portions of the shaft and said member.

Further objects of the invention will appear as the description proceeds in connection with the appended claims and the annexed drawing which is an assembly in axial section illustrating a geared wheel hub to axle connection according to a preferred embodiment of the invention.

Figure 1 in the drawings is an axial section, partly broken away, illustrating a gear and axle shaft connection according to one embodiment of the invention; and Figure 2 is an enlarged fragmentary section illustrating the stop ring and recess construction of Figure 1.

A hardened steel axle shaft 11, which is splined at its inner end at 12 for connection to one of the side gears of the usual differential assembly of a conventional drive axle, is formed with a similar splined portion 13 at its outer end. Preferably, in manufacturing the shaft according to the present invention, both ends of the shaft are initially made with similar splined ends, and one end 13 is modified to adapt it for purposes of the invention. A gear 14, which is preferably of hardened steel and formed with an integral hub 15 internally splined for press fit upon spline 13 is provided on its outer circumference with an annular row of gear teeth 16. Gear 14 provides the drive connection between shaft 11 and the wheel hub. Gear 14 is non-rotatably secured to shaft 11 by means of the splined connection, and is secured against axial movement relative to shaft 11 by a special structure to be described below.

The diameter of shaft 11 at the outer end of spline section 13 is reduced below the root of the spline to provide a relatively narrow cylindrical end surface 17 and a planar outwardly facing radial shoulder 18 perpendicular to the axis of shaft 11. Adjacent shoulder 18, an annular groove 19 is cut into surface 17. The purpose of groove 19 is to seat a flat annular snap ring 20 which has one flat side surface flush with the coextensive surface of shoulder 18, and the inner diameter of ring 20 is fairly snug with the bottom of groove 19. The outer periphery of ring 20 is spaced from the gear hub for ease of assembly. Ring 20 is preferably a flat sided spring steel ring which is radially split so as to be expanded for passing over surface 17 and is capable of contracting and reshaping itself to a perfect flat annulus when released within groove 19. Effectively ring 20 comprises an axially rigid abutment on the end of shaft 11 adjacent the splined portion 13 with flat sides perpendicular to the axis of the shaft.

The hub 15 of gear 14 is provided at its outer end with an internally cylindrical recessed surface 21 which intersects a planar radial shoulder 22 on the gear hub 15 perpendicular to the axis of the gear. In the assembly surfaces 18 and 22 are preferably coplanar so as to be bridged and contacted by the inner flat side of ring 20. Preferably surface 21 extends slightly beyond the adjacent end of shaft 11 to accommodate the below described second snap ring and washer assembly. Shoulder 22 is preferably formed before internally splining the hub of gear 14.

Outwardly spaced from radial shoulder 22, surface 21 is formed with an inwardly facing annular groove 23 adapted to seat a second snap ring 24 which is flat sided and annular, its flat sides both being perpendicular to the axis of the gear. The outer periphery of snap ring 24 is preferably snug with the bottom of groove 23 and its inner periphery has substantial clearance with surface 17 for ease in assembly. Preferably snap rings 20 and 24 are identical except for their differences in diameters. Snap ring 24 when in place comprises a radially inwardly extending annular abutment on gear 14.

Intermediate the abutments provided by rings 20 and 24, I interpose a flat annular soft steel stamped washer 25 which has its flat sides parallel and perpendicular to its central axis. Ring 25 is exactly of a thickness to fit snugly between the adjacent flat surfaces of rings 20 and 24 so as to form an axially solid connection therebetween. The radial extent of ring 25 is not particularly critical, as either of its peripheries may be spaced from the shaft end or from the gear, the preferred arrangement for improved sealing and strength being where its outer periphery fits fairly snugly within hub surface 21 and its inner periphery slightly clears the shaft surface 17. It is essential only that ring 25 has sufficient areas of overlap with both of rings 20 and 24 with which it is flatly and snugly engaged to prevent shearing under the axial stresses encountered during operation.

Preferably gear teeth 16 on the outer periphery of gear 14 are meshed with teeth 26 of a ring gear 27 which is rigidly secured to a wheel hub 28 as by a series of stud bolts 29, lock washers 31 and nuts 32. An annular spacer and gear protecting disk 33 is provided between ring gear 27 and the end of hub 28, and this disk may be varied in thickness according to the dimensions of the assembly as desired.

The stud and nut assembly 29—32 is also adapted for holding a generally cup shaped outer cover 34 on the end of the hub in protective relation to the gear and the connections between the hub and the shaft, a radial flat flange 35 being provided on the cover to be secured against the side of ring gear 27 coextensive with disc 33. The axial width of gear teeth 16 is slightly less than the width of teeth 26, and relative axial movement therebetween is held to small limits by disc 33 and flange 35.

The above described assembly provides a simple and inexpensive and readily constructed manner of gearing an axle shaft end to a wheel hub which overcome difficulties arising from unavoidable structural and operational misalignments between the hub and the axle shaft. The gear 14 may be accurately made apart from the axle shaft and correctly coaxially mounted thereon by the splined connection 13. The axle shaft may be taken from standard splined stock and speedily machined at one end to provide surface 17 and the lock ring groove. This reduces expense of manufacture. The double snap ring shear connection between the gear and the end of the axle shaft prevents any relative axial movement between the two during rotation together and holds the gear on the shaft in assembled relation. Preferably washer 25 is a simple soft steel stamping which needs only to be strong enough to take care of the shear incident to it as it is not subject to bearing wear.

Between gear teeth 16 and 26, a slight amount of backlash is preferably insured so as to provide an adequately flexible drive connection between the shaft and the hub regardless of any misalignment between the two arising from normal tolerances and inaccuracies in manufacture or to load deflection during operation. Thus when the axis of shaft 11 becomes slightly misaligned with respect to the axis of hub 28, the backlash in the above described drive connection is sufficiently flexible to allow slight relative rocking of teeth 16 and 26 and take care of this misalignment without excessive wear on the parts.

The axle shaft to gear hub connection is simple and does not structurally weaken either part. All of the machine and assembly operations are confined to end portions of the shaft and hub, and no weakening grooves are provided in the inner portions of the shaft which are subjected to high torsion and bending stresses.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a drive assembly, a shaft, a drive member non-rotatably secured to said shaft, and means interconnecting peripherally coextensive portions of said shaft and member for preventing relative axial movement therebetween, said means comprising rigid and oppositely extending radial members on said shaft and member respectively and an abutment member interposed between said radial members.

2. In the drive assembly defined in claim 1, said abutment member being radially free.

3. In the drive assembly defined in claim 1, said means being disposed within an axially open outer end recess of said drive assembly.

4. In a vehicle wheel drive assembly, an axle shaft having a splined outer end, an internally splined gear non-rotatably mounted on said outer shaft end, the outer ends of said gear and shaft being internally formed to provide an annular recess facing outwardly of the end of the assembly, and means in said recess extending between said shaft and gear for preventing relative axial movement therebetween.

5. In a drive assembly, a shaft having at one end a splined portion, an outwardly facing radial surface and an outer reduced portion in succession, a gear having an internally splined hub mounted on said splined shaft portion, the outer end of said gear extending over said reduced shaft portion and being formed with an outwardly facing radial shoulder and an enlarged internal end recess in succession, axially spaced oppositely facing grooves in said reduced shaft portion and said recess, removable fastening elements in said grooves, and an abutment element interposed between said fastening elements.

6. In the drive assembly defined in claim 5, said radial shoulders being flat and coplanar, and said fastening and abutment elements being flat sided rings with their adjacent flat sides in contact and with the inner flat side of the inner fastening element being in flush contact with both of said radial shoulders.

7. In the drive assembly defined in claim 5, said fastening elements comprising removable radially expansible locking rings seated in respective grooves.

8. Means for interconnecting a pair of coaxial members so as to prevent relative axial movement therebetween comprising oppositely facing axially spaced grooves formed in an end portion of the inner part and a surrounding portion of the outer part, radially projecting snap rings in said grooves and an abutment ring axially interposed between said snap rings.

9. In the drive assembly defined in claim 1, annular grooves provided in said shaft and drive member respectively for seating said radial members which comprise snap rings and said abutment member being comprised of an annular element.

10. In a drive assembly, a shaft, a drive transfer member non-rotatably mounted on said shaft, and means interconnecting peripherally coextensive portions of said shaft and member comprising an annular flat-sided groove in said shaft, a flat-sided snap ring in said groove with its sides snugly contacting the sides of said groove and projecting radially outwardly into an internal annular recess in said drive member and means in said recess providing flat parallel surfaces axially rigid with said member and engaging opposite sides of said snap ring for preventing relative axial movement between said shaft and said member in both directions.

HERBERT W. ALDEN.

REFERENCES CITED

The following references are of record in the file of this patent:

UNITED STATES PATENTS

| Number | Name | Date |
|---|---|---|
| 887,562 | Williams | May 12, 1908 |
| 1,001,697 | Sharp | Aug. 29, 1911 |
| 1,104,174 | Duffy | July 21, 1914 |
| 1,143,864 | Schneckloth | June 22, 1915 |
| 1,171,244 | Pugh | Feb. 8, 1916 |
| 1,507,012 | Weier | Sept. 2, 1924 |
| 1,588,373 | Jerram | June 8, 1926 |